(12) United States Patent
Tatenuma et al.

(10) Patent No.: US 11,478,850 B2
(45) Date of Patent: Oct. 25, 2022

(54) CONTINUOUS PRODUCING METHOD OF BERYLLIUM METAL SPHERE

(71) Applicant: Kaken Co., Ltd., Mito (JP)

(72) Inventors: Katsuyoshi Tatenuma, Mito (JP); Yuri Natori, Mito (JP); Norihiro Ikemoto, Mito (JP); Yoshiaki Akatsu, Mito (JP); Kazuo Yonehara, Mito (JP); Tomohiko Kawakami, Mito (JP)

(73) Assignee: Kaken Co., Ltd., Mito (JP)

( * ) Notice: Subject to any disclaimer, the term of this patent is extended or adjusted under 35 U.S.C. 154(b) by 388 days.

(21) Appl. No.: 17/022,546

(22) Filed: Sep. 16, 2020

(65) Prior Publication Data

US 2021/0114103 A1   Apr. 22, 2021

(30) Foreign Application Priority Data

Oct. 21, 2019 (JP) .............................. JP2019-191620

(51) Int. Cl.
 *B22F 9/04* (2006.01)
 *F27B 7/06* (2006.01)
 *F27D 15/00* (2006.01)

(52) U.S. Cl.
 CPC .................. *B22F 9/04* (2013.01); *F27B 7/06* (2013.01); *F27D 15/00* (2013.01); *B22F 2301/056* (2013.01); *B22F 2304/15* (2013.01)

(58) Field of Classification Search
 CPC .. B22F 9/04; B22F 2301/056; B22F 2304/15; F27B 7/06; F27D 15/00
 See application file for complete search history.

(56) References Cited

U.S. PATENT DOCUMENTS 5,958,105 A    9/1999  Ishitsuka et al.
7,560,069 B2 * 7/2009  Kawamura .............. G21B 1/13
                                                  420/401

FOREIGN PATENT DOCUMENTS

JP         3076068 B2    8/2000
JP         2012-88102 A  5/2012

* cited by examiner

*Primary Examiner* — Anthony J Zimmer
*Assistant Examiner* — Nazmun Nahar Shams
(74) *Attorney, Agent, or Firm* — Crowell & Moring LLP

(57) ABSTRACT

A method to produce metallic beryllium spheres with high sphericity in a large quantity efficiently at a low cost is provided herein. The method of continuously producing metal beryllium spheres comprises the steps of: collecting granulated beryllium spheres produced by charging beryllium powder into a rotary kiln; classifying the collected beryllium spheres by particle size with an automatic sieve; and crushing particles of beryllium spheres of non-target diameters and mixing them with the raw material beryllium powder for reuse. The rotary kiln has a core tube the inner surface of which is coated with beryllium oxide by sintering the slurry coating of beryllium hydroxide applied after alkaline silica treatment.

3 Claims, 5 Drawing Sheets

Rotation granulation sintering method

Fig. 5

Comparison of Be sphere producing method

| Production method | Invented method (BeSS) | Magnesium reduction method | Rotating Electrode Production method REP |
|---|---|---|---|
| Surface condition | Ripples-form | Irregular | Smooth (with holes) |
| Sphericity | 90% or more | 70 to 85% | 95% or more |
| Sintered density (g/cc) Theoretical density ratio %TD | 1.85 98% or more TD | 1.75 to 1.79 ab. 95 to 97 TD | 1.70 to 1.78 ab. 92 to 96 TD |
| Chemical purity | Depend on Be raw powder | ? | Depend on Be raw powder |
| Yield (production loss) | 95% or more (Loss 5% or less) | - | 70% or less (Loss 30% or more) |
| Manufacturing process and Controllability | Simple | - | Difficult |
| Manufacturing time | Short (less than 10 to 30 min.) | - | Long (1 to 3 or more days) |
| Mass productivity | Easy | - | Difficult |
| Production cost | 550,000 to 600,000 Y/kg | 1,200,000 Y/kg | 6,000,000 Y/kg |

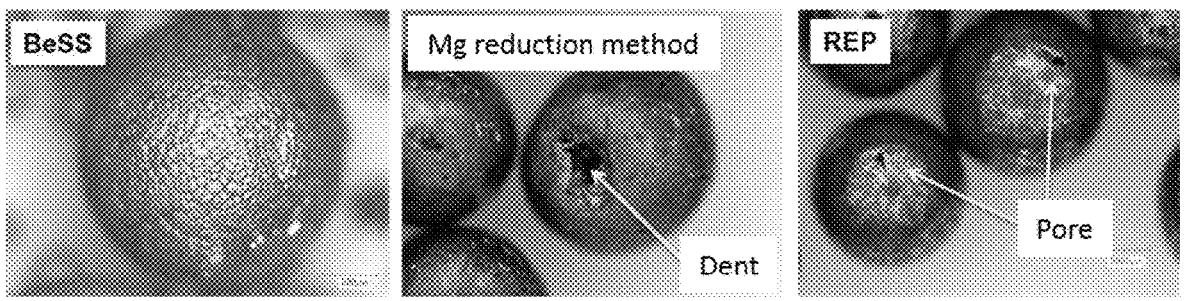

CONTINUOUS PRODUCING METHOD OF BERYLLIUM METAL SPHERE

TECHNICAL FIELD

The present invention relates to a manufacturing method of continuously producing a mass metal beryllium spheres with high sphericity.

BACKGROUND ART

Tritium (T), which is used as a fusion reactor fuel, is produced by irradiating lithium (Li) with neutrons. For producing tritium efficiently by increasing the numbers of neutron, examples of neutron multiplier material for increased number of neutrons include metal beryllium (Be) and beryllium intermetallic compounds (beryllide). Beryllium is essential and utilized for X-ray transmission films in medical X-ray equipment, neutron reflector in uranium type nuclear reactor, and neutron multiplier in nuclear fusion reactors. This substance is used in a form of blocks, or 1 mm diameter spheres.

As described in Patent Literature 1, methods for producing metal beryllium includes molten salt electrolysis method that gives flaky (thin leaf) or powdery (powdered) metal beryllium by melting and electrolyzing beryllium chloride ($BeCl_2$), and beryllium fluoride ($BeF_2$) reduction method with magnesium (Mg) to produce a metal beryllium in the form of pebbles (fine spheres).

However, the rotating electrode production method may sometimes be employed instead because the pebble produced by the magnesium reduction method contains a large number of impurity elements and has low sphericity as well. In this method, metal beryllium of solid-cylindrical shape is placed in a closed apparatus and used as an electrode to generate plasma, and by rotating the electrode, the melted beryllium droplets are scattered and solidified. With this rotating production electrode method, spherical metal beryllium pebbles are produced.

It should be noted that when the metal beryllium is neutron-irradiated, it may be damaged by swelling (volume expansion). Therefore, as described in Patent Literature 2, there is also disclosed an invention of a method of producing metal beryllium pebbles in which occurrence of swelling is prevented and tritium releasing ability is improved.

LITERATURE OF CONVENTIONAL ART

Patent Literature

{Patent Literature 1}
Japanese Unexamined Patent Application Publication No. 2012-088102
{Patent Literature 2}
Japanese Patent No. 3076068

SUMMARY OF INVENTION

Technical Problem

Rotating electrode method have made possible smaller sphere size and higher sphericity. However, production yield (yield rate) is not high despite large-scale of equipment causes high cost and complex manufacturing process.

Therefore, an objective of the present invention is to efficiently produce a large number of metal beryllium spheres that have high sphericity with a simple method at a low cost.

Solution to Problem

In order to solve the above problems, the present invention provides a method of continuous producing metal beryllium spheres. The method comprises steps of: introducing beryllium powder into a rotary kiln to granulate beryllium spheres; to recover the granulated beryllium spheres; classifying the recovering beryllium spheres by each particle size using an automatic sieve; crushing beryllium spheres having non-target particle diameter; and mixing the crushed the beryllium spheres of non-target particle diameter with the beryllium powder to be introduced to reuse. The rotary kiln has a alumina furnace core tube that inner surface is coated by beryllium oxide. This coating is produced in a method that the inner surface of the core tube is alkaline silica treated then coated with a slurry of beryllium hydroxide, and then sinter it to form beryllium oxide.

The continuous producing method of metal beryllium spheres is further featured in: that the thickness of beryllium oxide coating on the inner surface of furnace core tube of the rotary kiln is 50 to 200 μm; and that the furnace core tube is tilted at 5 to 10° and is heated to 1300 to 1500° C. in an inert gas atmosphere and is rotated at a speed of 20 to 120 r.p.m.

In the continuous producing method of metal beryllium spheres, the automatic sieving is featured to separate 0.5 to 2 mm diameter particles.

Advantageous Effects of Invention

According to the present invention, metal beryllium microspheres having high sphericity can be efficiently mass-produced at a low cost by a simple method. In addition, in granulating beryllium sphere by a rotary kiln, the inner surface of the alumina ($Al_2O_3$) furnace core tube coating by beryllium oxide (BeO), which is inactive at high temperatures, prevents beryllium powder to oxidize and to fuse. This coating treatment with beryllium oxide enables beryllium spheres to be produced smoothly and continuously.

BRIEF DESCRIPTION OF DRAWINGS

FIG. 5 This is an explanatory drawing to show a comparison of the present invention of the method of producing metal beryllium spheres continuously with a conventional producing method.

MODE OF IMPLEMENTING INVENTION

Embodiments of the present invention will be described below in detail with reference to the drawings. It should,

EXAMPLE 1

Figure 1:
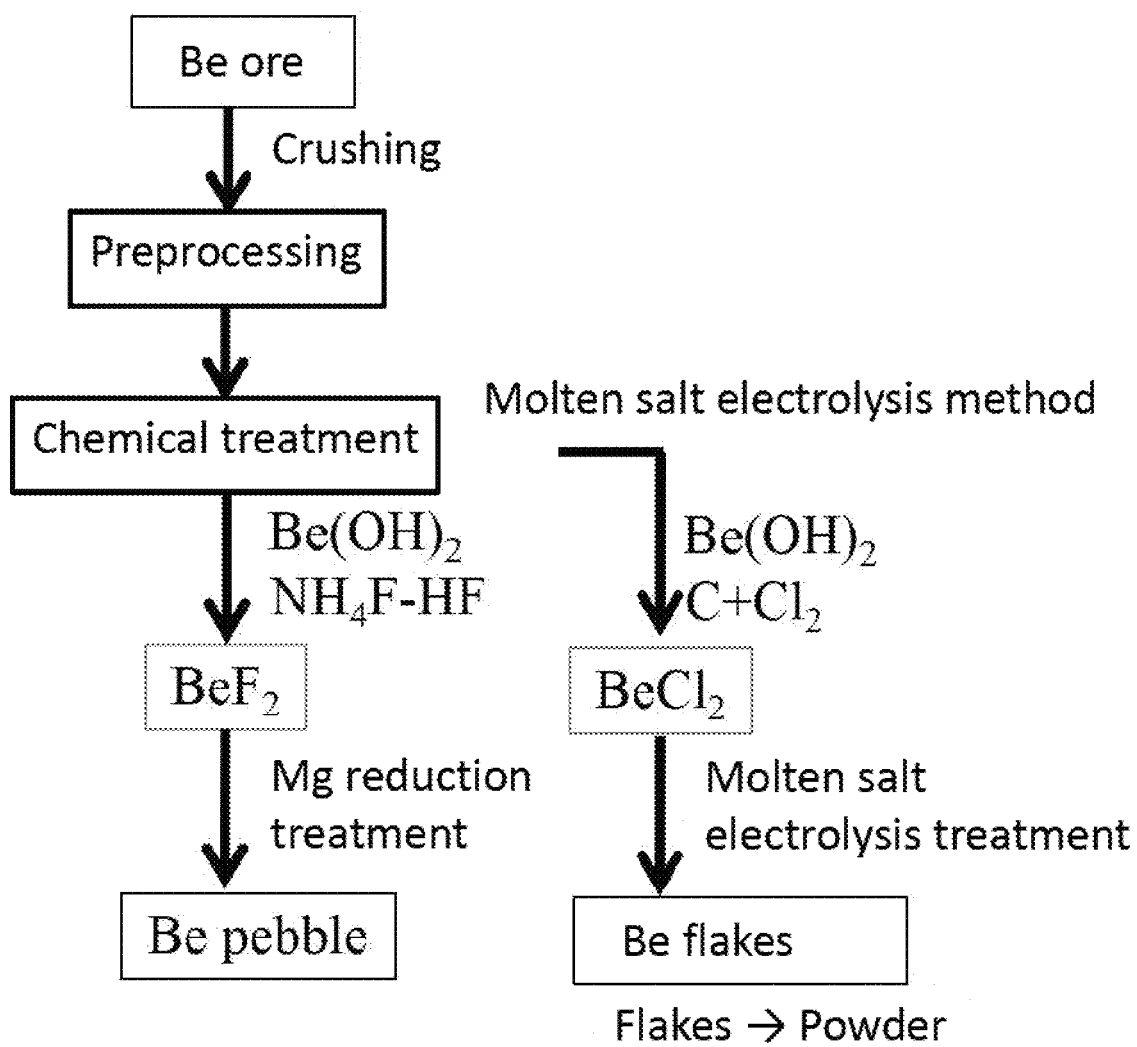
FIG. 1 This is an explanatory drawing to show a purification steps from beryllium ore to powder on invented method of producing metal beryllium spheres continuously.
Figure 2:
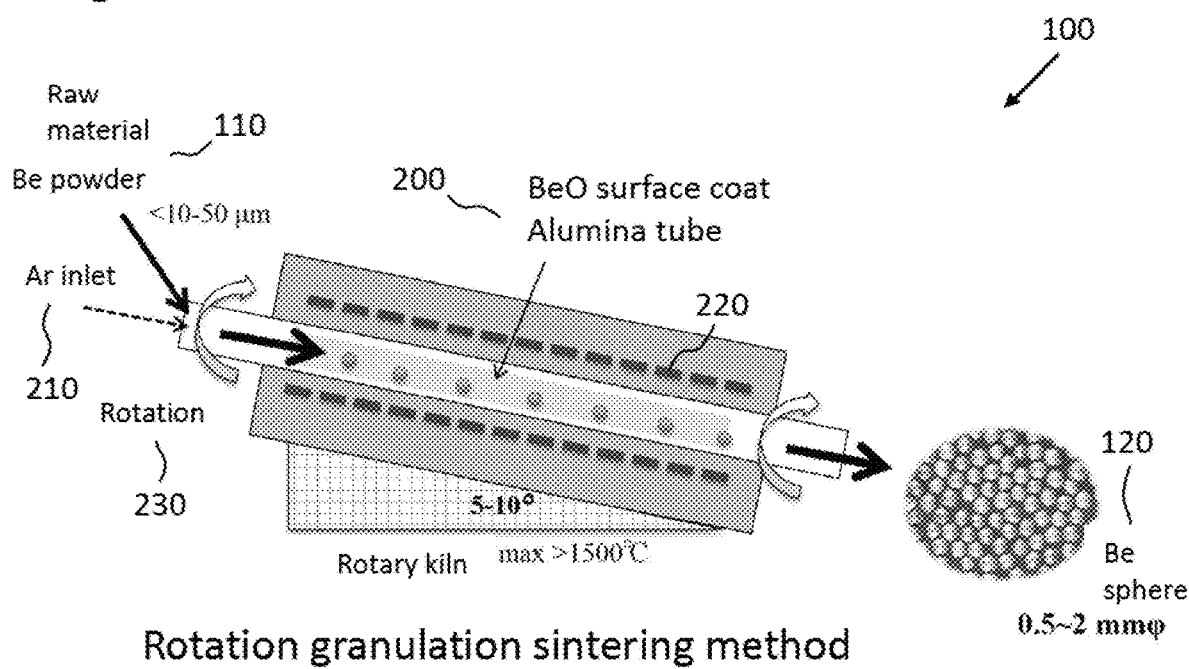
FIG. 2 This is an explanatory drawing to show a general view of the rotary kiln to be used in the invented method of producing metal beryllium spheres continuously.
Figure 3:
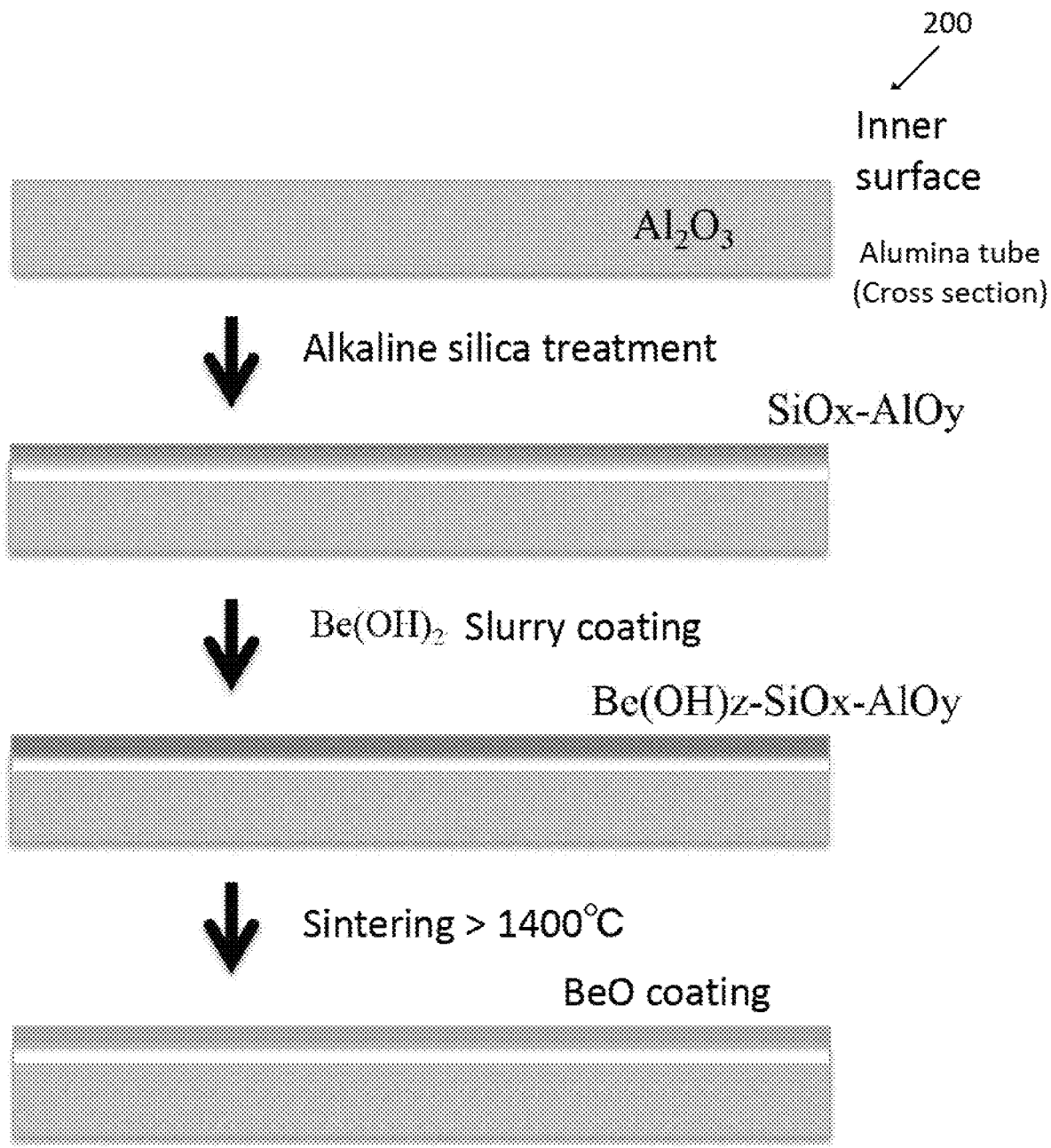
FIG. 3 This is an explanatory drawing to show a furnace core tube of the rotary kiln used in the present invention of the method of producing metal beryllium spheres continuously.
Figure 4:
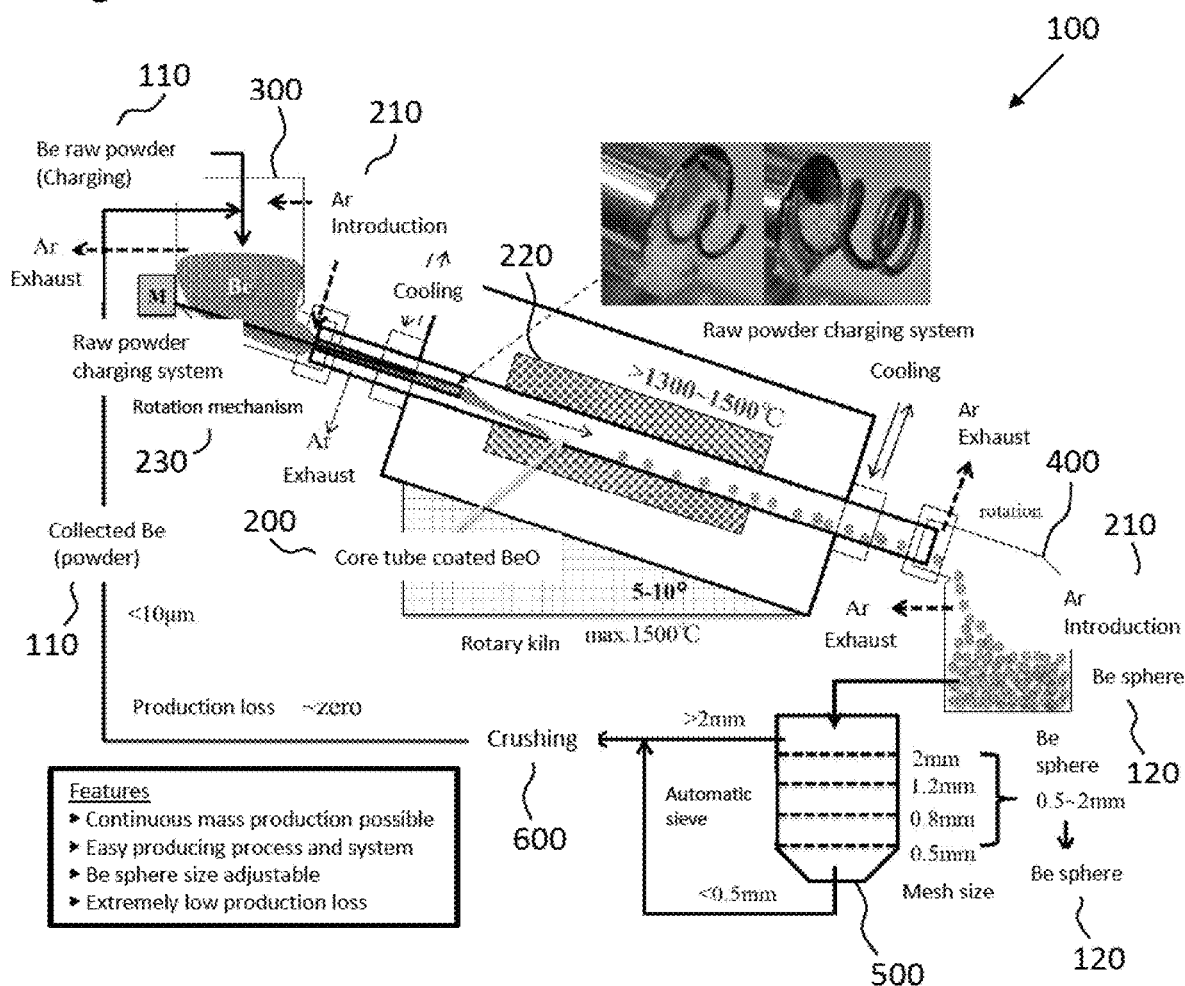
FIG. 4 This is an explanatory drawing to show an entire process flow of the present invention of the method of producing metal beryllium spheres continuously.

First, a method of continuously producing metal beryllium spheres according to the present invention will be described. FIG. 1 is the explanatory drawing to show the processing steps of producing raw material beryllium to be used in the method of producing metal beryllium spheres continuously. FIG. 2 is the explanatory drawing to show a general view of the rotary kiln to be used in the method of producing metal beryllium spheres continuously. FIG. 3 is the explanatory drawing to show a state of the core furnace tube in the rotary kiln. FIG. 4 is the explanatory drawing to show an entire process flow of the method of producing metal beryllium spheres continuously. FIG. 5 is the explanatory drawing to show a comparison of the method of producing metal beryllium spheres continuously with a conventional producing method.

As shown in FIG. 1, there are such as a magnesium reduction method and a molten salt electrolysis method for producing metal beryllium. With this rotating electrode method, spherical metal beryllium pebbles are produced. Then, beryllium hydroxide is reacted with ammonium hydrogen fluoride ($NH_4F$—HF), and then beryllium fluoride (BeF2) is produced by removing impurities and heat treatment. Further, beryllium fluoride is mixed with magnesium and reduced while heating at 1300° C., so that beryllium spheres having a particle size of about 1 mm and a large number of irregularities are produced.

Similarly, in the molten salt electrolysis method, after beryllium ore is crushed and chemically treated, beryllium hydroxide is produced. Then, beryllium hydroxide is produced to react electrolytically with chlorine using a carbon electrode to produce beryllium chloride ($BeCl_2$). Beryllium chloride ($BeCl_2$) is produced by electrolytically reacting beryllium hydroxide and chlorine at a carbon electrode. Further, beryllium chloride is melted and electrolyzed to produce beryllium pieces. This beryllium pieces are crushed into beryllium powder, which can be reused as a raw material.

As shown in FIG. 2, using the rotary kiln 100, beryllium spheres 120 (particle size: 0.5 to 2 mm) having high sphericity is produced from beryllium raw powder 110 (particle size: 10 to 50 μm), which is a raw material. As the rotary kiln 100, a rotary kiln having a core tube 200 inclined by 5 to 10° is used, and a heating means 220 such as a heater is arranged around the core tube 200. The material is heated to 1300 to 1500° C. as the melting point of beryllium is 1287° C.; and it is sufficient to control the rotation speed and inclination angle of the rotary kiln 100.

An inert gas 210 such as argon (Ar) or helium (He) is introduced into the core tube 200 to prevent oxidation of beryllium reaction, and beryllium powder 110 is introduced from an upper inlet charging part 300 (refer to FIG. 4) into the core tube 200 that is rotating driven by a rotating means 230. Beryllium powder 110 which has been heated in the core tube 200 are solidified and sintered, and spirally rolling down in the core tube 200 to grow into the beryllium spheres 120, which are then granulated and sintered. The beryllium spheres so produced are collected at bottom recovering part 400 (see FIG. 4).

An alumina tube, which is a kind of ceramics, is used for the core tube 200. Since beryllium is chemically active at high temperatures, it is generally easy to react with the inner surface (inner wall) of the heated core tube 200 of ceramic. Therefore, the charged beryllium powder 110 or the formed beryllium spheres 120 may be fused onto the inner wall of the core tube 200, and smooth granulation of the beryllium spheres 120 may not proceed.

In order to prevent this fusion, beryllium oxide is formed in a film-form on the inner surface of the core tube 200. Beryllium oxide, which has a high melting point and a low vapor pressure, is an excellent refractory material and is a chemically extremely stable substance that does not react with acid or alkali.

As shown in FIG. 3, the inner surface of the alumina tube, i.e., the inner surface of the core tube 200, is first given alkaline silica treatment. Following that, the slurry of beryllium hydroxide is coated thereon. Then the slurry coating is heated at 1400° C. to be formed into Beryllium oxide coating (coating thickness: 50 to 200 μm).

As shown in FIG. 4, the beryllium powder 110 is introduced into the core tube 200 from the inlet part 300 is heated in an atmosphere of the inert gas 210 while rolling down inside the beryllium oxide coated furnace core tube 200 and sintered to form the beryllium spheres 120, which are then covered at the collecting part 400.

After that, the beryllium spheres 120 are classified with an automatic sieving 500 according to the target particle sizes. The opening sizes of the automatic sieve 500 are, for example, 0.5 mm, 0.8 mm, 1.2 mm, and 2 mm. If the particle size is outside the target (less than 0.5 mm or larger than 2 mm), particles of such sizes are crushed by a crusher 600 and then-introduced into the inlet part 300, and mixed with the beryllium powder 110 as the raw material, then reused. This treatment reduces the loss of raw material beryllium.

As shown in FIG. 5, in the conventional magnesium reduction method, the surface of the produced beryllium sphere has many irregularities, the sphericity as well is low at 70 to 85%, and the sintering density is 1.75 to 1.79 g/cc (95-97%), which is slightly low, and manufacturing cost is high. Further, on the other hand, in the conventional rotating electrode method, the sphericity of the produced beryllium sphere is as high as 95% or more, and its surface is smooth. There, however, is a case where the spheres may have holes, and the sintered density is as low as 1.70 to 1.78 g/cc (92 to 96%). The manufacturing time is long (it takes 1 to 3 days or more), the manufacturing cost is considerably high, and the loss of beryllium, the raw material, in the manufacturing process is 30% or more.

In contrast to this, in the present invention, the surface of beryllium spheres produced is ripplet-like, its sphericity is as high as 90% or more and its sintered density is reaches 1.85 g/cc (98 to 100%). Further, the manufacturing time is short (10 to 30 min. or less), the production cost is low, and the production loss is 5% or less. Moreover, the manufacturing process is simple and mass production is easy.

The present invention makes it possible to produce metal beryllium spheres having high sphericity efficiently in a mass-production at a low cost by a simple method. By coating beryllium oxide is inert at high temperature is coated on inner surface of the alumina core tube, fusing onto the core tube and oxidation of raw powder are prevented on granulating beryllium powder in a rotary kiln. Thus, the beryllium oxide coating treatment allows beryllium spheres to be produced smoothly and continuously.

An example of embodiments of the present invention has been described as above, but the present invention can be carried out in another mode, not limited to the described one. For example, the present invention is available when producing spheres of tritium breeding material ($Li_2TiO_3$ or $Li_2O$) as well as neutron multiplier material (Be), which are an indispensable material for nuclear fusion, or when producing spheres of another metals or ceramics.

REFERENCE SIGNS LIST

100: Rotary kiln
110: Beryllium powder
120: Beryllium sphere
200: Furnace core tube
210: Inert gas
220: Heating means
230: Rotating means
300: Input part
400: Recovering part
500: Automatic sieving
600: Crusher

The invention claimed is:

1. Method of continuously producing metal beryllium spheres, comprising the steps of:
　introducing beryllium powder into a rotary kiln and recovering beryllium spheres granulated by heating the beryllium powder while rotating the rotary kiln;
　classifying recovered beryllium spheres with an automatic sieving by particle size; and;
　crushing beryllium spheres having a non-target particle diameter among classified beryllium spheres and mixing them with said beryllium powder for reuse,
　wherein said rotary kiln has a core tube of an alumina tube, an inner surface of which is covered with beryllium oxide by sintering the inner surface of the alumina tube coated with beryllium hydroxide slurry after applying alkaline silica treatment.

2. The method of continuously producing metal beryllium spheres according to claim 1, wherein:
　the thickness of said beryllium oxide layer on the inner surface of said rotary kiln is 50 to 200 μm;
　said core tube is inclined 5 to 10° to the horizontal; and
　said core tube is heated to 1300 to 1500° C. in an inert gas atmosphere and rotated at a speed of 20 to 120 r.p.m.

3. The method of continuously producing metal beryllium spheres according to claim 1, wherein said automatic sieve has a sieving opening of 0.5 to 2 mm.

* * * * *